United States Patent
Wu et al.

(10) Patent No.: US 11,597,425 B2
(45) Date of Patent: Mar. 7, 2023

(54) RAKE HOLD LOAD PLATE FOR STEERING SYSTEM

(71) Applicant: Steering Solutions IP Holding Corporation, Saginaw, MI (US)

(72) Inventors: Yihong (Britney) Wu, Jiangsu (CN); Michael P. Anspaugh, Bay City, MI (US); Shenbing (Assur) Wen, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/369,414

(22) Filed: Jul. 7, 2021

(65) Prior Publication Data

US 2022/0009543 A1 Jan. 13, 2022

Related U.S. Application Data

(60) Provisional application No. 63/049,335, filed on Jul. 8, 2020.

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC ................................ B62D 1/187; B62D 1/184
See application file for complete search history.

(56) References Cited

U.S. PATENT DOCUMENTS

| | | | | |
|---|---|---|---|---|
| 7,735,391 B2 * | 6/2010 | Osawa | ................... | B62D 1/184 280/775 |
| 8,931,364 B2 * | 1/2015 | Hirooka | ................. | B62D 1/184 280/775 |
| 8,939,468 B2 * | 1/2015 | Schnitzer | ............... | B62D 1/184 280/775 |
| 9,162,700 B2 | 10/2015 | Tinnin | | |
| 2006/0243084 A1 * | 11/2006 | Osawa | ................... | B62D 1/184 74/484 R |

FOREIGN PATENT DOCUMENTS

| | | | | | |
|---|---|---|---|---|---|
| CN | 113071555 A | * | 7/2021 | ............. | B62D 1/184 |
| JP | 2014227156 A | | 12/2014 | | |
| WO | WO-2011070950 A1 | * | 6/2011 | ............. | B62D 1/184 |

OTHER PUBLICATIONS

English translation of Official Letter regarding corresponding DE App. No. 10 2021 117 671.9; dated Jun. 29, 2022.

* cited by examiner

*Primary Examiner* — Drew J Brown
(74) *Attorney, Agent, or Firm* — Dickinson Wright PLLC

(57) ABSTRACT

A friction plate for a vehicle steering system is provided. The friction plate includes a plate body defining a slot for receiving a rake bolt therethrough, the plate body having a planar side. The friction plate also includes a plurality of protrusions extending from the plate body to define a non-planar region of the friction plate.

13 Claims, 3 Drawing Sheets

RAKE HOLD LOAD PLATE FOR STEERING SYSTEM

CROSS-REFERENCE TO RELATED APPLICATION

This application claims the benefits of priority to U.S. Patent Application No. 63/049,335, filed Jul. 8, 2020, the disclosure of which is incorporated by reference herein in its entirety.

TECHNICAL FIELD

The following description relates to vehicle steering systems and, more particularly, to a rake hold load plate for such steering systems.

BACKGROUND

A vehicle, such as a car, truck, sport utility vehicle, crossover, mini-van, marine craft, aircraft, all-terrain vehicle, recreational vehicle, or other suitable vehicles, include various steering systems, such as steer-by-wire, driver interface and autonomous, for example. These steering system schemes typically include a steering column for translating steering input to an output that interacts with a steering linkage to cause the vehicle wheels (or other elements) to turn the vehicle and/or provide energy absorption. Some steering columns are axially adjustable between positions to provide flexibility in the location of the hand wheel to facilitate comfortable driving positions for different sizes of drivers or autonomous driving capability. Many axially adjustable steering columns further include rake adjustment mechanisms that permit tilt movement around one or more pivot points.

Measures are often necessary to prevent rake movement. For example, rake movement is typically facilitated by a rake actuator that includes a rake adjustment lever that can be moved between a locked position and an unlocked position. In the locked position, the rake adjustment lever is positioned such that rake movement of the steering column assembly is prevented. In the unlocked position, the rake adjustment lever is articulated from the locked position such that rake movement of the steering column assembly is permitted.

In some steering systems, the telescope holding load is generated by: 1) friction between a rake bracket and a compression bracket and/or 2) friction between an upper jacket and a lower jacket. The rake holding load may be generated by: 1) friction between the rake bracket and the compression bracket, 2) friction between the rake bracket and lower jacket, 3) friction between the rake bracket and an inner cam, and 4) friction between the rake bracket and a spacer or thrust bearing. In some cases, it is challenging to meet rake holding hold requirements when considering using friction between the upper and lower jackets as the energy absorption load, since the rake holding load and the energy absorption load are then coupled. Additionally challenging is the distance between the point at the center of the steering wheel ("A point") and the center of the rake adjustment bolt being too long. Finally, manufacturers may require a coating for the column assembly. Addressing these issues would be well received in the various arts.

SUMMARY

According to one aspect of the disclosure, an adjustable steering column assembly includes at least one jacket adjustable over a range of tilt positions. The adjustable steering column assembly also includes a rake adjustment lever operatively connected to the at least one jacket and pivotable between a locked position and an unlocked position. The adjustable steering column assembly further includes a locking mechanism actuated by the rake adjustment lever. The locking mechanism includes a rake bracket surrounding a portion of the at least one jacket. The locking mechanism also includes a rake bolt rotated by the rake adjustment lever and extending through the rake bracket and a cam arrangement configured to clamp and unclamp the rake bracket and the at least one jacket to selectively lock and unlock a rake position of the at least one jacket. The locking mechanism further includes a spacer disposed in abutment with the rake bracket, the rake bolt extending through an aperture defined by the spacer. The locking mechanism yet further includes a thrust bearing having the rake bolt extending therethrough. The locking mechanism also includes a friction plate disposed between the spacer and the thrust bearing and defining a slot, the rake bolt extending through the slot of the friction plate, wherein the friction plate has at least one protrusion to define a non-planar side, the at least one protrusion in contact with the rake bracket during all range of motion of the rake adjustment lever.

According to another aspect of the disclosure, an adjustable steering column assembly includes at least one jacket adjustable over a range of tilt positions. The adjustable steering column assembly also includes a rake adjustment lever operatively connected to the at least one jacket and pivotable between a locked position and an unlocked position. The adjustable steering column assembly further includes a locking mechanism actuated by the rake adjustment lever. The locking mechanism includes a rake bracket surrounding a portion of the at least one jacket. The locking mechanism also includes a rake bolt rotated by the rake adjustment lever and extending through the rake bracket and a cam arrangement configured to clamp and unclamp the rake bracket and the at least one jacket to selectively lock and unlock a rake position of the at least one jacket. The locking mechanism further includes a spacer disposed in abutment with the rake bracket, the rake bolt extending through an aperture defined by the spacer. The locking mechanism yet further includes a thrust bearing having the rake bolt extending therethrough. The locking mechanism also includes a friction plate disposed between the spacer and the thrust bearing and defining a slot, the rake bolt extending through the slot of the friction plate, wherein the friction plate comprises a plate body and a plurality of protrusions, wherein the plate body and the spacer define a clearance therebetween when the rake adjustment lever is moved to the unlocked position.

According to yet another aspect of the disclosure, a friction plate for a vehicle steering system is provided. The friction plate includes a plate body defining a slot for receiving a rake bolt therethrough, the plate body having a planar side. The friction plate also includes a plurality of protrusions extending from the plate body to define a non-planar region of the friction plate.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be illustrated or described in detail, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
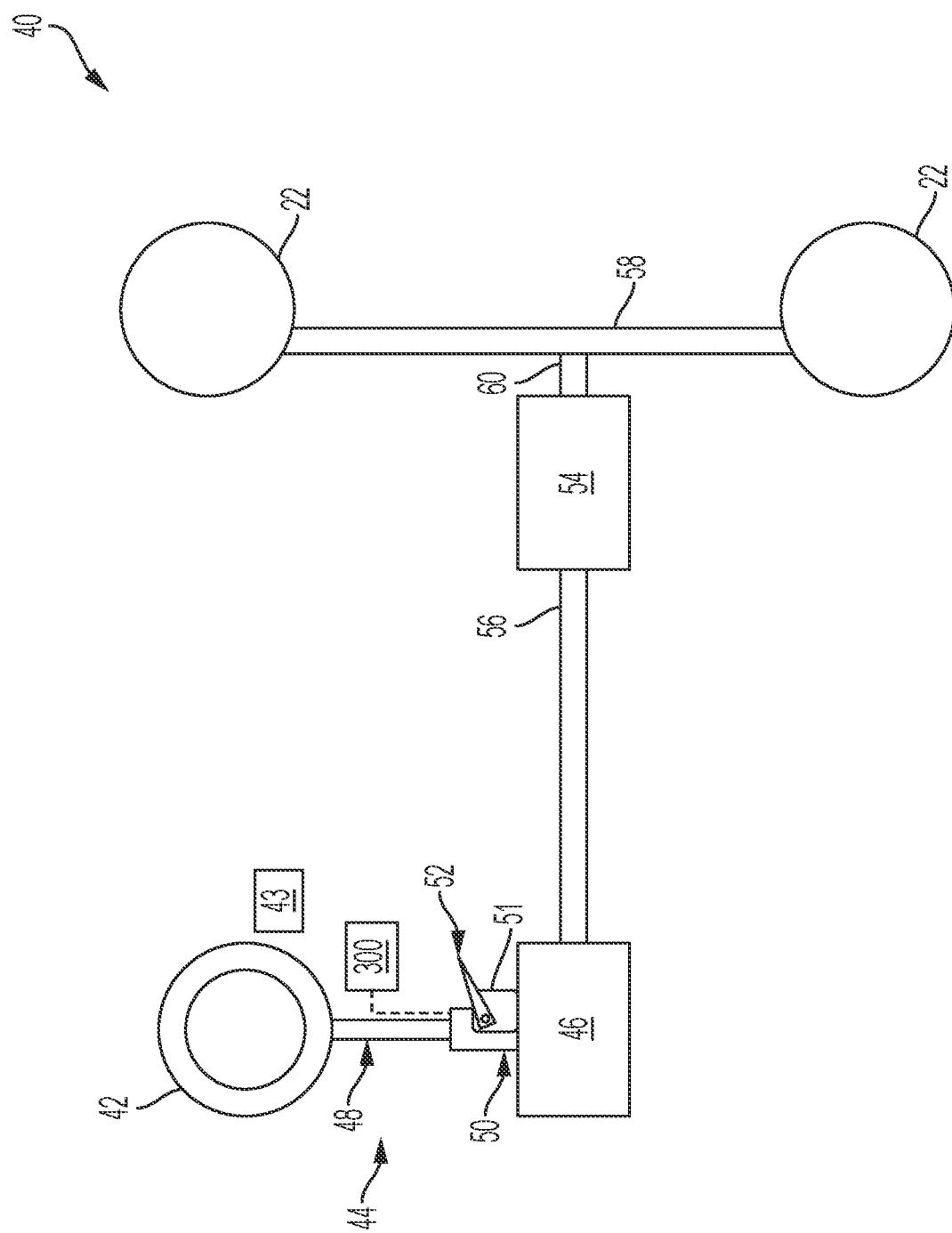
FIG. 1 is a schematic illustration of a vehicle steering system.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located proximate the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements facilitated manually or with a powered axial actuator. The steering column assembly 44 may include a bracket 51 that at least partially connects the steering column to the vehicle. A rake adjustment lever 52 may be operatively connected to one of the first jacket 48, the second jacket 50, or the bracket 51 to facilitate tilting adjustment of the steering column assembly 44. In some embodiments, behavior of the rake adjustment lever 52 may be controlled manually. In some embodiments, behavior of the rake adjustment lever 52, and possibly axial adjustment actuator (not shown) in some embodiments, or combinations thereof may be controlled via a control system 300 including a CPU unit.

The steering column assembly 44 is moveable between a range of operating positions from a fully extended or full telescopic out position to a fully retracted or full telescopic in position. In the extended position, the first jacket 48 and second jacket 50 are moved axially relative to each other so that the input device 42 is located near an operator of the vehicle. In the retracted position, the first jacket 48 and second jacket 50 are moved axially relative to each other so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In some embodiments, the retracted position can be on the order of about 150 mm away from the extended position, such as at least 100 mm, or at least about 125 mm away from the extended position. In some embodiments, an axial adjustment actuator (manual or powered) effectuates axial movement between the first jacket 48 and second jacket 50 to adjustment between the extended position and the retracted position.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operatively connected to the steering gear assembly 54 such that a rotation of the steering gear input shaft 56 causes a responsive movement of the output shaft 60 and causes the drive axle to turn the wheels 22.

Figure 3:
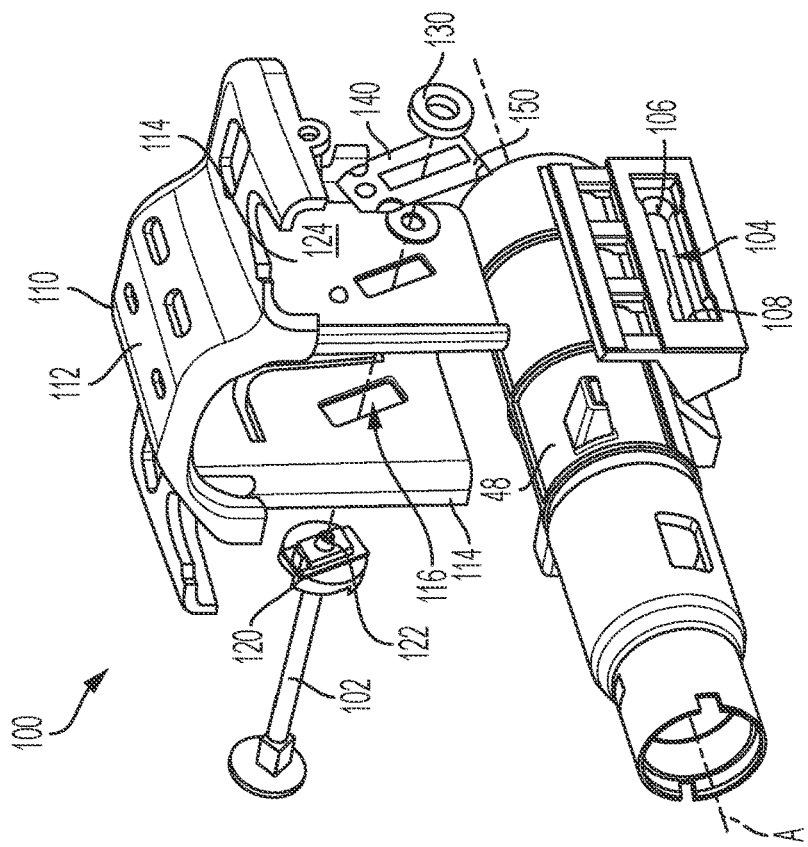
FIG. 3 is a perspective view of the rake adjustment mechanism showing a rake hold load plate in a partially disassembled condition.
Figure 2:
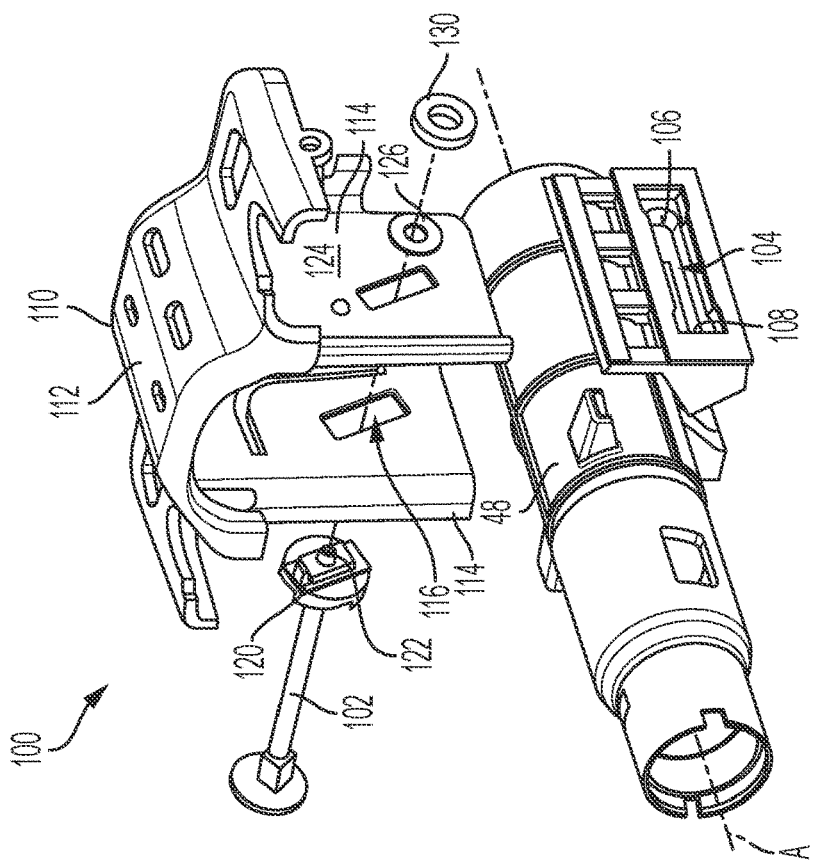
FIG. 2 is a perspective view of a rake adjustment mechanism of the vehicle steering system in a partially disassembled condition.

FIGS. 2 and 3 generally illustrate a perspective partially disassembled view of the steering column assembly 44 with a rake adjustment mechanism illustrated and referenced generally with 100. When assembled, the first jacket 48 and the second jacket may extend along an axis A. The rake adjustment mechanism 100 is operatively coupled to the rake adjustment lever 52 with a rake bolt 102 that extends through the first jacket 48 and/or the second jacket 50. Accordingly, the jacket through which the rake bolt 102 extends may simply be referred to herein as "the jacket" or "the at least one jacket".

The jacket 48 defines a slot 104 into the first jacket. The slot 104 may extend substantially parallel to the axis A between a first end 106 associated with the full telescope out position and a second end 108 associated with the full telescope in position. Although illustrated and described herein as a slot, the feature referenced with numeral 104 could be replaced with a hold for non-telescope adjust systems and the slot 104 does not always need to be partially recessed.

A rake bracket 110 includes a base portion 112 and a pair of legs 114 extending from the base portion 112. The legs 114 are spaced from each other to partially surround the jacket 48 in an assembled condition. Each leg 114 defines a respective slot 116 that overlaps with the slot 104 of the jacket 48 in an assembled condition. The slot ends of the slots 116 of the rake bracket 110 define extreme tilt positions for the steering system 40.

A cam arrangement 120 defines a central aperture 122 sized to receive the rake bolt 102 therethrough. The cam arrangement 120 is rotated by the rake bolt 102 during actuation of the rake adjustment lever 52 and is positioned to clamp and unclamp the rake bracket 110 and the at least one jacket 48 to selectively lock and unlock a rake position of the at least one jacket 48 within a range of rake positions.

One leg of the rake bracket 110 includes an outer side 124 that has at least one spacer 126 positioned adjacent the outer side 124. The spacer 126 defines a central aperture sized to receive the rake bolt 102 therethrough. The central aperture of the spacer 126 is positioned to overlap with the slot 116 of the leg 114 of the rake bracket 110 in an assembled condition. A thrust bearing 130 defines a central aperture sized to receive the rake bolt 102 therethrough. The central aperture of the thrust bearing 130 is positioned to overlap with the central aperture of the spacer 126 in an assembled condition.

As shown in FIG. 3, a friction plate 140 is provided and is located between the spacer 126 and the thrust bearing 130. With reference to both FIGS. 3 and 4, the friction plate 140 is shown in greater detail in FIG. 4, but the context of its location is represented in FIG. 3. The friction plate 140 may be formed of stainless steel in some embodiments, but alternative materials are contemplated.

As shown, the friction plate 140 includes a plate body 142. The plate body 142 may be formed in various alternative general shapes, with the illustrated example showing one embodiment. The plate body 142 defines a slot 144 that is in general alignment with the slot 116 of the rake bracket 110 in an assembled condition. The slot 144 is configured to receive the rake bolt 102 therethrough and is operatively coupled to the rake bracket 110 with a mechanical fastener extending through corresponding holes 146 of the friction plate 140 and the rake bracket 110 to move with the rake bracket 110 during operation in a tilting direction. The friction plate 140 includes at least a portion thereof which is elastically deformable to transmit a clamping load when the rake adjustment lever 52 is in the locked position.

Figure 4:
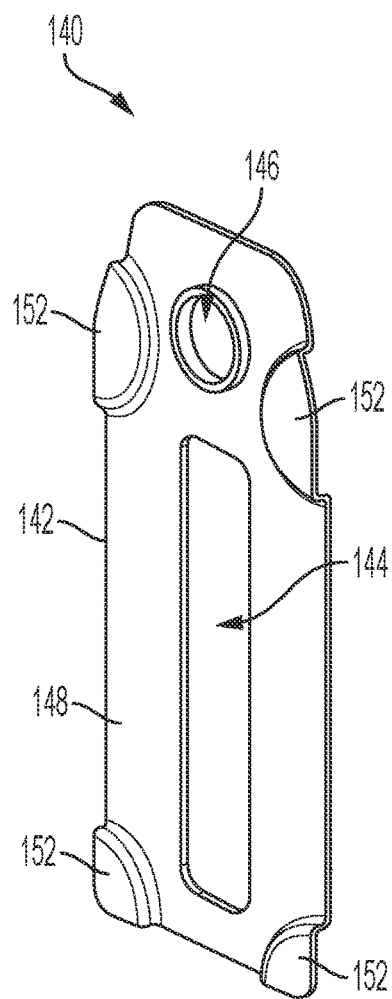
FIG. 4 is a perspective view of the rake hold load plate.

The plate body 142 includes a first side 148 and a second side 150. The first side 148 faces the rake bracket 110 and the second side 150 faces the thrust bearing 130, as shown in FIG. 3. As best shown in FIG. 4, the first side 148 of the friction plate 140 is generally planar (i.e., flat), except for at least one protrusion 152 extending away from the first side 148 toward the rake bracket 110. In the illustrated embodiment, four protrusions 152 are present to provide the non-planar surface of the first side 148. The four protrusions 152 may be located in generally opposing corners of the friction plate 140 on the first side 148. The geometry of the protrusions 152 may vary from that shown, but they are sized to either remain in contact with the rake bracket 110 or within a targeted proximity of the rake bracket 110 during all range of motion of the rake adjustment lever 52. Contact or targeted proximity between the four protrusions 152 and the rake bracket is maintained during all phases of operation. This combined with a clearance defined between the friction plate 140 and the spacer 126 improves delash characteristics of the overall assembly when the rake adjustment lever 52 is released.

Figure 5:
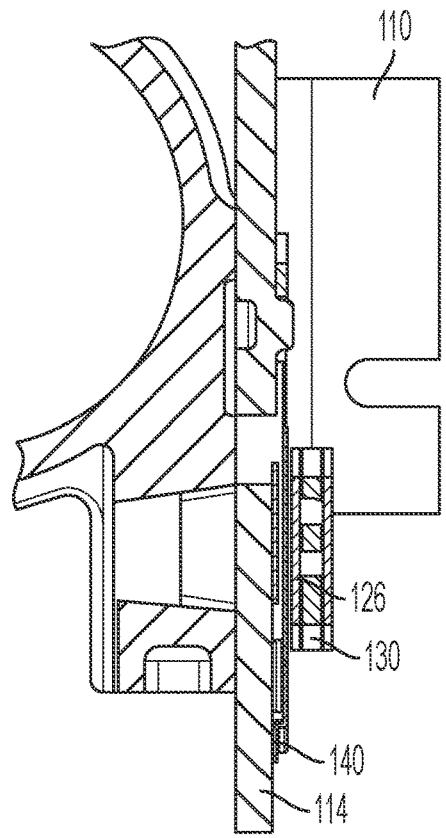
FIG. 5 is an elevational view of a portion of the rake adjustment mechanism.
Figure 6:
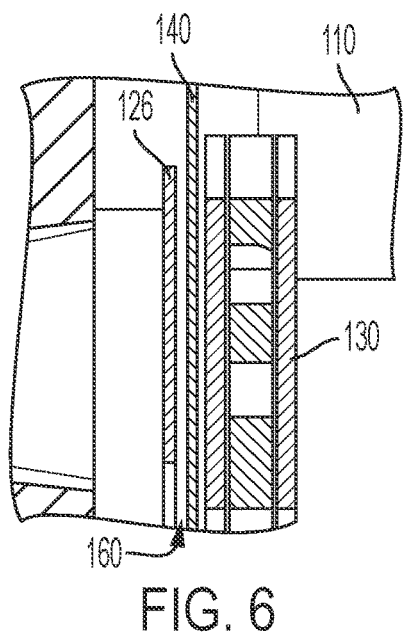
FIG. 6 is an enlarged, elevational view of the portion of FIG. 5.
Figure 7:
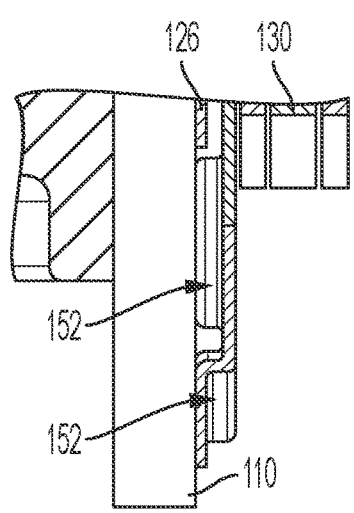
FIG. 7 is an enlarged, elevational view of another portion of FIG. 5.

FIG. 5 illustrates an enlarged view of the side of the rake bracket 110 that the friction plate 140 is disposed on. The above noted clearance defined by the friction plate 140 and the spacer 126 is shown well in FIG. 6 and is referenced generally with numeral 160. The constant contact between the plurality of protrusions 152 and the rake bracket 110 is shown well in FIG. 7.

The friction plate 140 increases the rake holding load by adding two extra contact surfaces when compared to systems without a friction plate. These extra interfaces are provided between the spacer 126 and the friction plate 140, as well as between the friction plate 126 and the thrust bearing 130. Accordingly, the rake holding load is approximately 1.5 times higher than an assembly without a friction plate. It is possible to stack additional friction plates 110 with modified and/or eliminated protrusions 154 and spacers 126 to achieve additional rake holding load incrementally beyond 1.5 times.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An adjustable steering column assembly comprising:
at least one jacket adjustable over a range of tilt positions;
a rake adjustment lever operatively connected to the at least one jacket and pivotable between a locked position and an unlocked position; and
a locking mechanism actuated by the rake adjustment lever, the locking mechanism comprising:
a rake bracket surrounding a portion of the at least one jacket;
a rake bolt rotated by the rake adjustment lever and extending through the rake bracket and a cam arrangement configured to clamp and unclamp the rake bracket and the at least one jacket to selectively lock and unlock a rake position of the at least one jacket;
a spacer disposed in abutment with the rake bracket, the rake bolt extending through an aperture defined by the spacer;
a thrust bearing having the rake bolt extending therethrough; and
a friction plate disposed between the spacer and the thrust bearing and defining a slot, the rake bolt extending through the slot of the friction plate, wherein the friction plate has at least one protrusion to define a non-planar side, the at least one protrusion in contact with the rake bracket during all range of motion of the rake adjustment lever, wherein the at least one protrusion comprises four protrusions located proximate opposing corners of the friction plate.

2. The adjustable steering column assembly of claim 1, wherein the friction plate is formed of stainless steel.

3. The adjustable steering column assembly of claim 1, wherein the friction plate comprises a plate body and the four protrusions, wherein the plate body and the spacer define a clearance therebetween when the rake adjustment lever is moved to the unlocked position.

4. The adjustable steering column assembly of claim 3, wherein a portion of the friction plate is elastically deformable to increase a clamping load when the rake adjustment lever is in the locked position.

5. An adjustable steering column assembly comprising:
at least one jacket adjustable over a range of tilt positions;

a rake adjustment lever operatively connected to the at least one jacket and pivotable between a locked position and an unlocked position; and a locking mechanism actuated by the rake adjustment lever, the locking mechanism comprising:

a rake bracket surrounding a portion of the at least one jacket;

a rake bolt rotated by the rake adjustment lever and extending through the rake bracket and a cam arrangement configured to clamp and unclamp the rake bracket and the at least one jacket to selectively lock and unlock a rake position of the at least one jacket;

a spacer disposed in abutment with the rake bracket, the rake bolt extending through an aperture defined by the spacer;

a thrust bearing having the rake bolt extending therethrough; and a friction plate disposed between the spacer and the thrust bearing and defining a slot, the rake bolt extending through the slot of the friction plate, wherein the friction plate comprises a plate body and a plurality of protrusions, wherein the plate body and the spacer define a clearance therebetween when the rake adjustment lever is moved to the unlocked position, wherein the plurality of protrusions comprises four protrusions.

6. The adjustable steering column assembly of claim 5, wherein the four protrusions are located proximate opposing corners of the friction plate.

7. The adjustable steering column assembly of claim 5, wherein the plurality of protrusions define a non-planar side, the plurality of protrusions in contact with the rake bracket during all range of motion of the rake adjustment lever.

8. The adjustable steering column assembly of claim 5, wherein the friction plate is formed of stainless steel.

9. The adjustable steering column assembly of claim 5, wherein a portion of the friction plate is elastically deformable to increase a clamping load when the rake adjustment lever is in the locked position.

10. A friction plate for a vehicle steering system, the friction plate comprising:

a plate body defining a slot for receiving a rake bolt therethrough, the plate body having a planar side; and a plurality of protrusions extending from the plate body to define a non-planar region of the friction plate, wherein the plurality of protrusions comprises four protrusions.

11. The friction plate of claim 10, wherein the four protrusions are located proximate opposing corners of the friction plate.

12. The friction plate of claim 10, wherein the friction plate is formed of stainless steel.

13. The friction plate of claim 10, wherein the friction plate is formed of an elastically deformable material.

\* \* \* \* \*